(12) United States Patent
Colledge et al.

(10) Patent No.: US 8,024,345 B2
(45) Date of Patent: Sep. 20, 2011

(54) SYSTEM AND METHOD FOR ASSOCIATING QUERIES AND DOCUMENTS WITH CONTEXTUAL ADVERTISEMENTS

(75) Inventors: Matthew Colledge, Montreal (CA); Marc Carrier, Montreal (CA)

(73) Assignee: Idilia Inc., Montreal (CA)

( * ) Notice: Subject to any disclaimer, the term of this patent is extended or adjusted under 35 U.S.C. 154(b) by 0 days.

(21) Appl. No.: 12/853,040

(22) Filed: Aug. 9, 2010

(65) Prior Publication Data

US 2010/0324991 A1    Dec. 23, 2010

Related U.S. Application Data

(62) Division of application No. 10/921,817, filed on Aug. 20, 2004, now Pat. No. 7,774,333.

(60) Provisional application No. 60/496,681, filed on Aug. 21, 2003, provisional application No. 60/496,680, filed on Aug. 21, 2003.

(51) Int. Cl.
*G06F 7/00* (2006.01)
*G06F 17/30* (2006.01)

(52) U.S. Cl. ........................................................ 707/741

(58) Field of Classification Search ................... 707/736, 707/741
See application file for complete search history.

(56) References Cited

U.S. PATENT DOCUMENTS

| | | |
|---|---|---|
| 5,237,503 A | 8/1993 | Bedecarrax et al. |
| 5,317,507 A | 5/1994 | Gallant |
| 5,325,298 A | 6/1994 | Gallant |
| 5,477,451 A | 12/1995 | Brown et al. |
| 5,510,981 A | 4/1996 | Berger et al. |
| 5,519,786 A | 5/1996 | Courtney et al. |
| 5,541,836 A | 7/1996 | Church et al. |
| 5,675,819 A | 10/1997 | Schuetze |
| 5,768,603 A | 6/1998 | Brown et al. |
| 5,794,050 A | 8/1998 | Dahlgren et al. |
| 5,805,832 A | 9/1998 | Brown et al. |
| 5,873,056 A * | 2/1999 | Liddy et al. ........................ 704/9 |
| 5,907,839 A | 5/1999 | Doth |
| 5,996,011 A | 11/1999 | Humes |
| 6,038,560 A | 3/2000 | Wical |
| 6,070,134 A | 5/2000 | Richardson et al. |
| 6,076,088 A | 6/2000 | Paik et al. |
| 6,078,878 A | 6/2000 | Dolan |
| 6,081,775 A | 6/2000 | Dolan |
| 6,088,692 A | 7/2000 | Driscoll |
| 6,092,034 A | 7/2000 | McCarley et al. |
| 6,098,033 A | 8/2000 | Richardson et al. |
| 6,098,065 A | 8/2000 | Skillen et al. |
| 6,105,023 A | 8/2000 | Callan |
| 6,138,085 A | 10/2000 | Richardson et al. |
| 6,253,170 B1 | 6/2001 | Dolan |

(Continued)

FOREIGN PATENT DOCUMENTS

EP    1061465 A2    12/2000

(Continued)

*Primary Examiner* — Angela M Lie
(74) *Attorney, Agent, or Firm* — Santosh K. Chan; Blake, Cassels & Graydon LLP

(57) ABSTRACT

A computer implemented method and system for associating advertisements with a web page comprises: obtaining advertisement keyword meanings associated with the advertisements; indexing the advertisements according to the keyword meanings; disambiguating the page to identify page keyword meanings; expanding the page keyword meanings; searching for matches between the advertisement keyword meanings and the expanded page keyword meanings to identify relevant advertisements; and providing the relevant advertisements in association with the web page.

10 Claims, 5 Drawing Sheets

U.S. PATENT DOCUMENTS

| | | |
|---|---|---|
| 6,256,629 B1 | 7/2001 | Sproat et al. |
| 6,260,008 B1 | 7/2001 | Sanfilippo |
| 6,366,908 B1 | 4/2002 | Chong et al. |
| 6,405,162 B1 | 6/2002 | Segond et al. |
| 6,421,675 B1 | 7/2002 | Ryan et al. |
| 6,453,315 B1 | 9/2002 | Weissman et al. |
| 6,816,857 B1 | 11/2004 | Weissman et al. |
| 6,826,559 B1 * | 11/2004 | Ponte ................................. 1/1 |
| 7,698,266 B1 * | 4/2010 | Weissman et al. ..... 707/999.005 |
| 2002/0026456 A1 | 2/2002 | Bradford |
| 2002/0120712 A1 | 8/2002 | Maislin |
| 2003/0028367 A1 | 2/2003 | Chalabi |
| 2003/0078928 A1 | 4/2003 | Dorosario |
| 2003/0101182 A1 | 5/2003 | Govrin et al. |
| 2004/0064447 A1 * | 4/2004 | Simske et al. .................... 707/5 |
| 2004/0249824 A1 * | 12/2004 | Brockway et al. ........... 707/100 |
| 2005/0021397 A1 | 1/2005 | Cui et al. |
| 2005/0033771 A1 | 2/2005 | Schmitter et al. |
| 2005/0108200 A1 * | 5/2005 | Meik et al. ........................ 707/3 |
| 2005/0216516 A1 * | 9/2005 | Calistri-Yeh et al. ...... 707/104.1 |
| 2006/0026071 A1 | 2/2006 | Radwin |
| 2011/0035440 A1 * | 2/2011 | Henkin et al. ................ 709/203 |

FOREIGN PATENT DOCUMENTS

| | | |
|---|---|---|
| EP | 597630 B1 | 7/2002 |
| WO | WO 00/58863 A | 10/2000 |
| WO | WO 00/79436 A2 | 12/2000 |
| WO | WO 01/42984 A1 | 6/2001 |
| WO | WO 02/10985 A2 | 2/2002 |
| WO | WO 02/17128 A1 | 2/2002 |
| WO | WO 02/099700 A1 | 12/2002 |

* cited by examiner

Fig. 3B

Knowledge base 400

Nodes Table 402

| Id 406 | Type 408 | Annotations 410 |
|---|---|---|
| bank 406A | word 408A | |
| LABEL001 408B | Fine Sense 408B | Noun, A financial institution 410B |
| LABEL002 | Fine Sense | Noun, sloping land or shoreline |
| LABEL003 | Fine Sense | Noun, A building in which commercial banking is transacted |
| LABEL004 | Fine Sense | Verb, to do business with a bank |
| LABEL005 | Coarse Sense | |
| deposit | word | |
| LABEL006 | Fine Sense | Noun, a facility where things can be deposited for storage or safe keeping |

Edge/Relations Table 404

| From node ID 412 | To node ID 414 | type 416 | Annotations 418 |
|---|---|---|---|
| bank | LABEL001 | Word to Fine Sense | 1 |
| bank | LABEL002 | Word to Fine Sense | 2 |
| bank | LABEL003 | Word to Fine Sense | 4 |
| bank | LABEL004 | Word to Fine Sense | 3 |
| bank | LABEL 005 | Word to Coarse Sense | |
| LABEL005 | LABEL001 | Coarse to Fine Sense | |
| LABEL005 | LABEL003 | Coarse to Fine Sense | |
| LABEL005 | LABEL004 | Coarse to Fine Sense | |
| deposit | LABEL006 | Word to Fine Sense | 8 |
| LABEL006 | LABEL003 | Hyponym | |

SYSTEM AND METHOD FOR ASSOCIATING QUERIES AND DOCUMENTS WITH CONTEXTUAL ADVERTISEMENTS

CROSS REFERENCE TO RELATED APPLICATIONS

This application is a Division of U.S. application Ser. No. 10/921,817, filed Aug. 20, 2004, which claims priority from U.S. Application No. 60/496,681, filed on Aug. 21, 2003, and U.S. Application No. 60/496,680, filed on Aug. 21, 2003. The entire contents of the aforementioned applications are incorporated herein by reference.

FIELD OF THE INVENTION

The present invention relates to systems and method for associating documents, such as web sites, to contextual advertisements, and in particular, associating web sites to paid listings and other forms of contextual advertising.

BACKGROUND OF THE INVENTION

When working with large sets of data, such as a database of documents or web pages on the Internet, the volume of available data can make finding information of interest difficult. Various methods of searching are used in an attempt to find relevant information in such stores of information. Some of the best known systems are internet search engines, such as Yahoo (trademark) and Google (trademark) which allow users to perform keyword-based searches. These searches typically involve matching keywords entered by the user with keywords in an index of web pages.

It is known for search engines to generate revenue by selling certain keywords to advertisers. These advertisers pay for a common search term, such as "bank" and have their ads shown to users when that word is entered in a query.

However, if the advertiser for the keyword "bank" is a financial institution, then their advertisements will appear even for other meanings of the word "bank" such as "to turn an aircraft." Some advertisers purchase a sequence of keywords such as "bank account" to better target their advertising. However, such sequences will match fewer results, so that a query for "bank loan" would not match "bank account."

There is a need for a system and method which addresses deficiencies in the prior art.

SUMMARY OF THE INVENTION

In one aspect, the present invention provides a computer implemented method of associating advertisements with a displayed web page, the method comprising the steps of:
a) (i) obtaining advertisement keyword meanings associated with the advertisements, each of the advertisement keyword meanings comprising a specific intended meaning of a word contained in the respective advertisement;
   (ii) indexing the advertisements according to the associated keyword meanings;
   (iii) storing the indexed advertisements in a database; and
b) (i) disambiguating content of the displayed page to identify keyword meanings of words contained in the displayed page, each of the page keyword meanings comprising a specific deduced intended meaning of a respective word on the web page, in view of the context of its usage on the web page;
   (ii) expanding the page keyword meanings using their relevant semantic relations to other word meanings to create a list of expanded page keyword meanings; and,
   (iii) searching the database of indexed advertisements to identify matches between the expanded page keyword meanings and the advertisement keyword meanings;
   (iv) extracting advertisements indexed to the advertisement keyword meanings matched to the page keyword meanings, the extracted advertisements comprising advertisements relevant to the displayed page;
   (v) displaying the relevant advertisements in association with the displayed page.

In another aspect, the invention provides a computer implemented method of associating advertisements with one or more web pages, the method comprising the steps of:
a) obtaining advertisement keyword meanings associated with the advertisements, the advertisement keyword meanings being supplied by advertisers or identified by disambiguating words in the advertisements, wherein each of the advertisement keyword meanings comprise a specific intended meaning of a word contained in the respective advertisement;
and,
b) (i) disambiguating content of the web pages to identify keyword meanings of words contained in the web pages, each of the page keyword meanings comprising a specific deduced intended meaning of a respective word on the web page, in view of the context of its usage on the web page;
   (ii) indexing at least one of the advertisements or the web pages, wherein the indexing is based on the associated keyword meanings of the advertisement or the web pages, respectively;
   (iii) searching the advertisement keyword meanings to identify matches between the web page keyword meanings and the advertisement keyword meanings, the matches comprising advertisements relevant to the web pages; and
   (iv) displaying the relevant advertisements in association with the web pages.

In another aspect, the invention provides a system for associating advertisements with a web page, the system comprising one or more tangible computer readable media having stored thereon:
   a database containing advertisements and associated advertisement keyword meanings;
   an indexing module for creating an advertisement reference index for the advertisements contained in the database, wherein the advertisements are indexed based on the associated advertisement keyword meanings;
   a disambiguation module for disambiguating words contained on the web page into page keyword meanings, each of the page keyword meanings comprising a specific deduced intended meaning of a respective word on the web page, in view of the context of its usage on the web page;
   a keyword expanding module for expanding the page keyword meanings using their relevant semantic relations to other word meanings to create an expanded list of page keyword meanings; and,
   a text processing module for:
   searching the advertisement reference index to find relevant advertisements for the web page by matching the page keyword meanings to the advertisement keyword meanings indexed in the database; and providing search results comprising the relevant advertisements.

According to one aspect of the present invention, there is provided a method of providing advertisements to users of a sponsored search engine, comprising the steps of disambiguating a paid search keyword and storing it in a paid search keyword sense database, disambiguating a query from one of the users, semantically expanding the keyword or the query, searching the database of paid search keyword senses to find advertisements relevant to the query using the keyword senses in the query, and returning advertising results which include advertisements for which the paid search keyword matches the query keyword senses and other word senses which are semantically related to the query keyword senses.

The method may be applied to any database which is indexed using keywords. Preferably, the method is applied to a search of the Internet.

The semantic relations may be any logically or syntactically defined type of association between two words. Examples of such associations are synonymy, hyponymy etc.

The step of disambiguating the query may include assigning probability to word senses.

The keyword senses used in the method may be coarse groupings of finer divisions of word senses.

The step of disambiguating the paid search keyword may be performed directly by the advertiser. Alternatively, the step of disambiguating the paid search keyword may be performed automatically or semi-automatically by using contextual information about the advertiser, such as the text of the advertisement, information from a web site of the advertiser or other information related to the advertiser and/or advertisement.

In a further aspect, a method of associating results from a query from a user directed to a search engine to advertisements associated with the search engine is provided. The method comprises the steps of: obtaining advertisement keyword senses associated with the advertisements; disambiguating the query to identify query keyword senses associated with the query; expanding the query keyword senses to include relevant semantic relations for the query keyword senses to create a list of expanded query keyword senses; using the expanded keyword senses to search the advertisement keyword senses to locate relevant advertisements correlating to the query; and providing the relevant advertisements to the user.

In the method, the step of expanding the query keyword senses may comprise utilizing disambiguation of the query keyword senses.

In the method, disambiguating the query to identify query keyword senses may comprise attaching probabilities to the keyword senses.

In the method, the keyword senses may represent a coarse grouping of fine keyword senses.

In another aspect, a system for associating results from a query from a user directed to a search engine to advertisements associated with the search engine is provided. The system comprises: a database containing advertisements associated with the search engine; an indexing module to create a reference index for the advertisements; a query processing module to apply the query to the search engine; and a disambiguation module for disambiguating the query to identify keyword senses associated with the query. In the system, the disambiguation module disambiguates information in the query into keyword senses; and the query processing module expands the keyword senses to include relevant semantic synonyms for the keyword senses to create a list of expanded keyword senses, initiates a search of the reference index to find relevant advertisements for the query using the expanded keyword senses; and provides relevant advertisements to the user.

In the system, the query processing module may expand the keyword senses utilizing relations between word senses in the knowledge base.

In the system, the disambiguation module may assign a probability to the keyword senses to rank the keyword senses.

In the system, the keyword senses represent a coarse grouping of fine keyword senses.

In another aspect, a method for defining a set of word senses for a web site for use as a matching tool for use with an Internet advertisement is provided. The method comprises identifying a set of keywords in the web site; and if a keyword in the set has at least two senses, then: accessing a knowledge base to identify a set of appropriate word senses for the keyword for the web site; and populating the set with the set of appropriate word senses.

The method may further comprise expanding the set of word senses by expanding and paraphrasing at least one word sense in the set of word senses.

In the method, expanding the set of word senses may utilize semantic relationships associated with the at least one word sense to expand the set. Further, paraphrasing may utilize semantically dependent terms derived from syntactic structures of selected words in the web site.

In another aspect, a method for defining a set of word senses for an advertisement for use as a matching tool for use with a web site is provided. The method comprises: identifying a set of keywords in the advertisement; and if a keyword in the set has at least two senses: accessing a knowledge base to identify a set of appropriate word senses for the keyword for the advertisement; and populating the set of word senses with the set of appropriate word senses; and expanding the set of word senses by expanding and paraphrasing at least one word sense in the set of word senses.

In other aspects various combinations of sets and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 3B is a diagram of data structures used to represent the semantic relationships of FIG. 3A for the system of FIG. 1.

DESCRIPTION OF THE INVENTION

Figure 1:
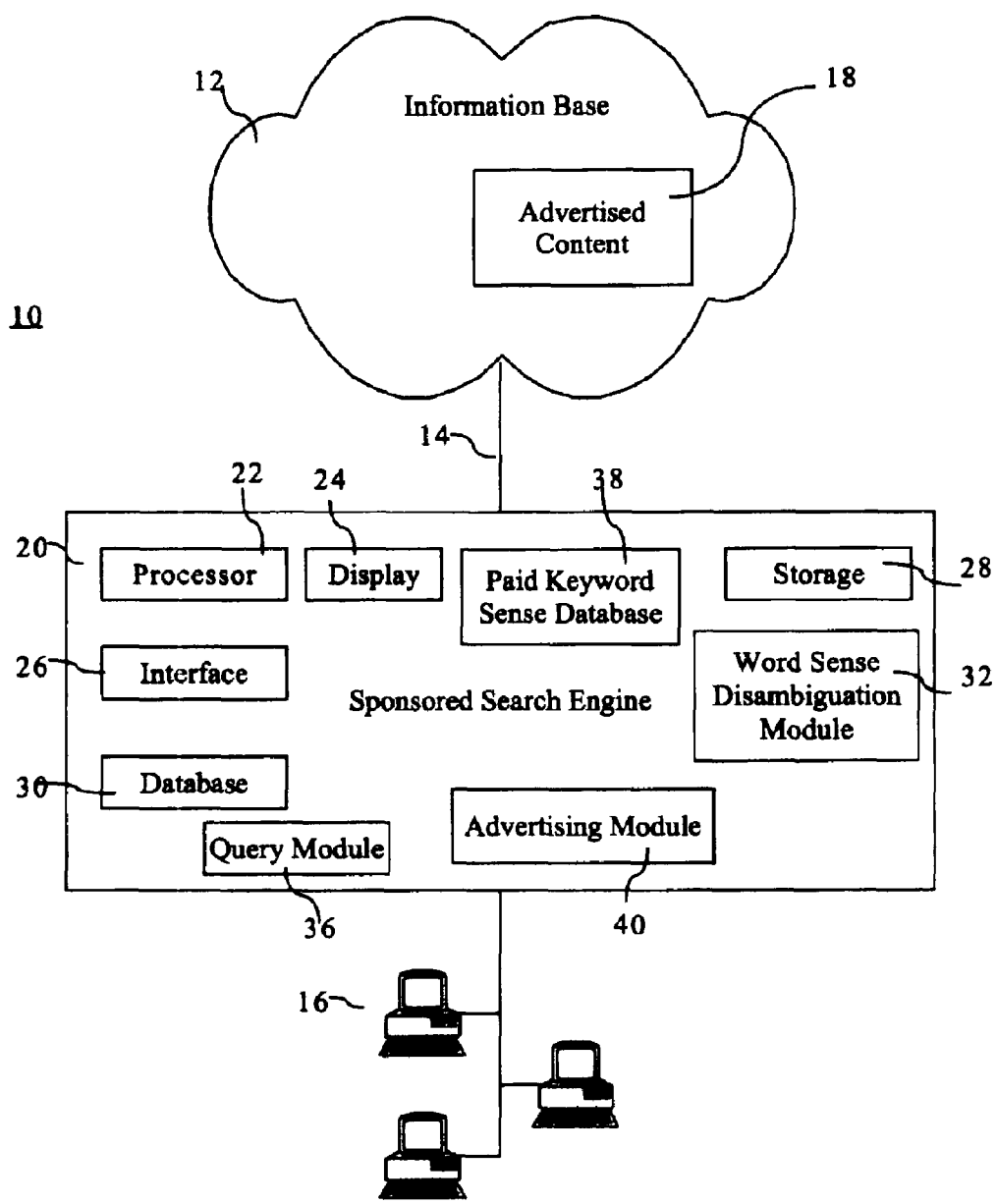
FIG. 1 is a schematic representation of a sponsored search engine associated with an embodiment of the invention.

The description which follows, and the embodiments described therein, is provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

The following terms will be used in the following description, and have the meanings shown below:

Computer readable storage medium: hardware for storing instructions or data for a computer. For example, magnetic disks, magnetic tape, optically readable medium such as CD ROMs, and semi-conductor memory such as PCMCIA cards. In each case, the medium may take the form of a portable item such as a small disk, floppy diskette, cassette, or it may take the form of a relatively large or immobile item such as hard disk drive, solid state memory card, or RAM.

Information: documents, web pages, emails, image descriptions, transcripts, stored text etc. that contain searchable content of interest to users, for example, contents related to news articles, news group messages, web logs, etc.

Module: a software or hardware component that performs certain steps and/or processes; may be implemented in software running on a general-purpose processor.

Natural language: a formulation of words intended to be understood by a person rather than a machine or computer.

Network: an interconnected system of devices configured to communicate over a communication channel using particular protocols. This could be a local area network, a wide area network, the Internet, or the like operating over communication lines or through wireless transmissions.

Query: a list of keywords indicative of desired search results; may utilize Boolean operators (e.g. "AND", "OR"); may be expressed in natural language.

Query module: a hardware or software component to process a query.

Search engine: a hardware or software component to provide search results regarding information of interest to a user in response to a query from the user. The search results may be ranked and/or sorted by relevance.

Sponsored search engine: a type of search engine that generates revenue by displaying relevant advertisements in response to queries.

The embodiment relates generally to system and methods for associating a search query or Information with an advertisement. This is particularly useful for web pages and search queries in the Internet. The advertisement is typically associated by third parties to a website or other Information. A Paid Search Listing is as a contextual type of advertisement that is displayed in response to one or more keywords in a query because the display of the ad was purchased. Another form of contextual advertisement involves identifying a selection of advertisements for display to a user based on the advertisement having an identifiable relation to the contextual information being presented to a user. Generally, this second form has advertisements associated with a web page. If a user clicks on a displayed advertisement, the web page owner gets a fee from the operator of the advertisement. For example, a site describing do-it-yourself auto-repair could choose to have advertisements related to the sale of replacement automotive parts displayed on the web page.

Referring to FIG. 1, an information retrieval system associated with an embodiment is shown generally by the number 10. The system includes a store of information 12 which is accessible through a network 14. The store of information 12 may include documents, web pages, databases, and the like. Preferably, the network 14 is the Internet, and the store of information 12 comprises web pages. When the network 14 is the Internet, the protocols include TCP/IP (Transmission Control Protocol/Internet Protocol). Various clients 16 are connected to the network 14, by a wire in the case of a physical network or through a wireless transmitter and receiver. Each client 16 includes a network interface as will be understood by those skilled in the art. The network 14 provides the clients 16 with access to the content within the store of information 12. To enable the clients 16 to find particular information, documents, web pages, or the like within the store of information 12, the system 10 is configured to allow the clients 16 to search for information by submitting queries. The queries contain at least a list of keywords and may also have structure in the form of Boolean relationships such as "AND" and "OR." The queries may also be structured in natural language as a sentence or question.

The system includes a sponsored search engine 20 connected to the network 14 to receive the queries from the clients 16 to direct them to individual documents within the store of information 12. The sponsored search engine 20 may be implemented as dedicated hardware, or as software operating on a general purpose processor. The search engine operates to locate documents within the store of information 12 that are relevant to the query from the client. The search results may be generated using any search method.

The store of information 12 also includes advertised content 18 within the store of information 12. Preferably each entry in the advertised content 18 corresponds to an advertisement suitable for display with search results. The advertisements may be textual and/or graphical and may include a reference or hyperlink to the corresponding entry in the advertised content 18. Advertisers pay to have their advertisement displayed preferentially by the sponsored search engine 20 when their advertised content is relevant to the query. The advertisement may be displayed next to the search results in a web browser or before other listings in the search result, or any other manner that places the advertisement in view of the client.

The search engine 20 generally includes a processor 22. The engine may also be connected, either directly thereto, or indirectly over a network or other such communication means, to a display 24, an interface 26, and a computer readable storage medium 28. The processor 22 is coupled to the display 24 and to the interface 26, which may comprise user input devices such as a keyboard, mouse, or other suitable devices. If the display 24 is touch sensitive, then the display 24 itself can be employed as the interface 26. The computer readable storage medium 28 is coupled to the processor 22 for providing instructions to the processor 22 to instruct and/or configure processor 22 to perform steps or algorithms related to the operation of the search engine 20, as further explained below. Portions or all of the computer readable storage medium 28 may be physically located outside of the search engine 28 to accommodate, for example, very large amounts of storage. Persons skilled in the art will appreciate that various forms search engines can be used with the embodiment.

Optionally, and for greater computational speed, the search engine 20 may include multiple processors operating in parallel or any other multi-processing arrangement. Such use of multiple processors may enable the search engine 20 to divide tasks among various processors. Furthermore, the multiple processors need not be physically located in the same place, but rather may be geographically separated and interconnected over a network as will be understood by those skilled in the art.

Preferably, the search engine 20 includes a database 30 for storing an index of word senses and for storing a knowledge base used by search engine 20. The database 30 stores the index in a structured format to allow computationally efficient storage and retrieval as will be understood by those skilled in the art. The database 30 may be updated by adding additional keyword senses or by referencing existing keyword senses to additional documents. The database 30 also provides a retrieval capability for determining which documents contain a particular keyword sense. The database 30 may be divided and stored in multiple locations for greater efficiency.

According to an embodiment, the sponsored search engine 20 includes a word sense disambiguation module 32 for processing a paid keyword sense in a query into word senses. A word sense is a given interpretation ascribed to a word, in view of the context of its usage and its neighbouring words. An advertisement can have one or more paid keyword sense. For example, the word "book" in the sentence "Book me a flight to New York" is ambiguous, because "book" can be a noun or a verb, each with multiple potential meanings. The paid keyword senses are chosen by advertisers and may comprise a word or words or phrases including keywords. As described above, the queries contain at least one keyword and are may be structured with Boolean operators or natural language. The result of processing of the words by the disambiguation module 32 is a disambiguated document or disambiguated query comprising word senses rather than ambiguous or uninterpreted words. The input document may be any unit of information in the store of information, or one of the queries received from clients. The word sense disambiguation module 32 distinguishes between word senses for each word in the document or query. The word sense disambiguation module 32 identifies which specific meaning of the word is the intended meaning using a wide range of interlinked linguistic techniques to analyze the syntax (e.g. part of speech, grammatical relations) and semantics (e.g. logical relations) in context. It may use a knowledge base of word senses which expresses explicit semantic relationships between word senses to assist in performing the disambiguation. The knowledge base may include relationships as described below with reference to FIGS. 3A and 3B.

The search engine 20 includes an indexing module 34 for processing a disambiguated document to create the index of keyword senses and storing the index in the database 30. The index includes an entry for each keyword sense relating to the documents in which it may be found. The index is preferably sorted and includes an indication of the locations of each indexed keyword sense. The index module 34 creates the index by processing the disambiguated document and adding each keyword sense to the index. Certain keywords may appear too many times to be useful and/or may contain very little semantic information, such as "a" or "the". These keywords may not be indexed.

The search engine 20 also includes a query module 36 for processing queries received from client 16. The query module 36 is configured to receive queries and transfer them to the disambiguation module 32 for processing. The query module 36 then finds results in the index that are relevant to the disambiguated query, as described further below. The results contain keyword senses semantically related to the word senses in the disambiguated query. The query module 36 provides the results to the client. The results may be ranked and/or scored for relevance to assist the client in interpreting them, using for example, probability of the keyword senses in the query and/or in the result document.

The sponsored search engine 20 includes a paid keyword sense database 38 and an advertising module 40. The paid keyword sense database 38 contains word senses corresponding to each paid keyword sense. Each paid keyword sense corresponds to an advertisement within the advertised content 18. Thus, when the word senses corresponding to a paid keyword sense are found in a disambiguated query, the corresponding advertisement is shown to the user by the advertising module 40.

Figure 2:
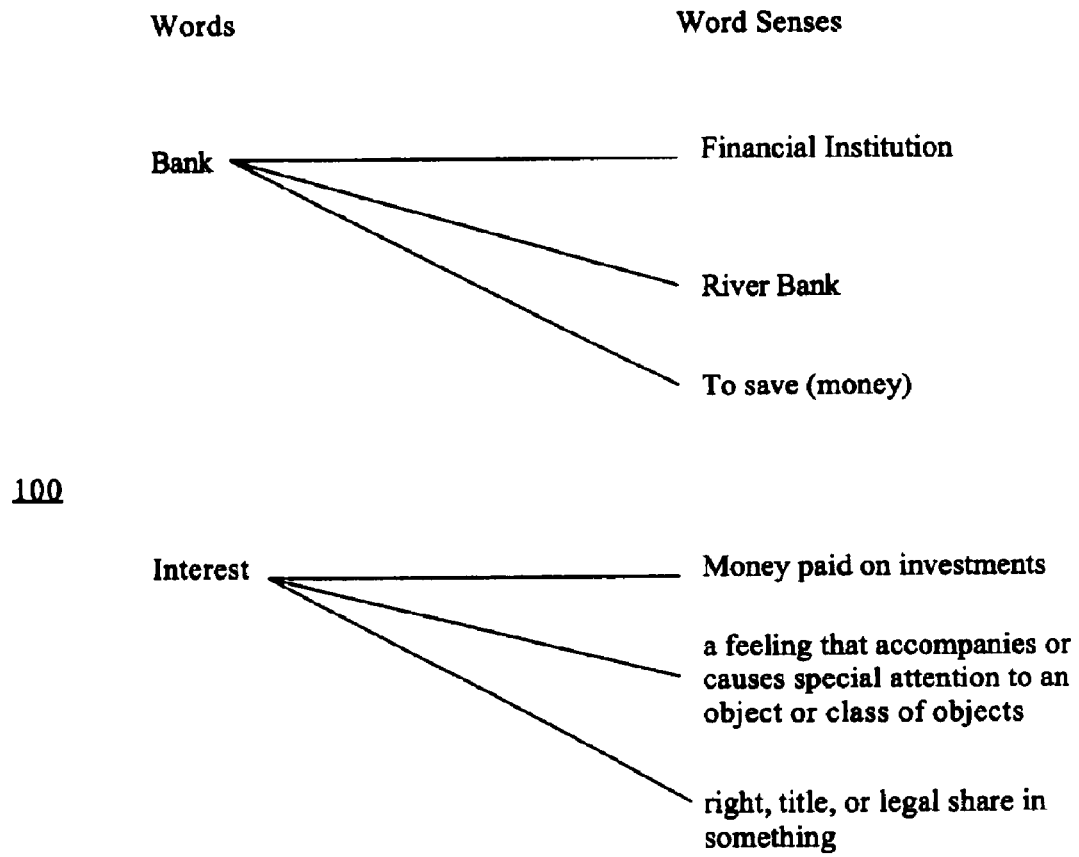
FIG. 2 is a schematic representation of words and word senses associated with the system of FIG. 1.

Referring to FIG. 2, the relationship between words and word senses is shown generally by the reference 100. As seen in this example, certain words have multiple senses. Among many other possibilities, the word "bank" may represent: (i) a noun referring to a financial institution; (ii) a noun referring to a river bank; or (iii) a verb referring to an action to save money. The word sense disambiguation module 32 splits the ambiguous word "bank" into less ambiguous word senses for storage in the index. Similarly, the word "interest" has multiple meanings including: (i) a noun representing an amount of money payable relating to an outstanding investment or loan; (ii) a noun representing special attention given to something; or (iii) a noun representing a legal right in something.

Figure 3A:
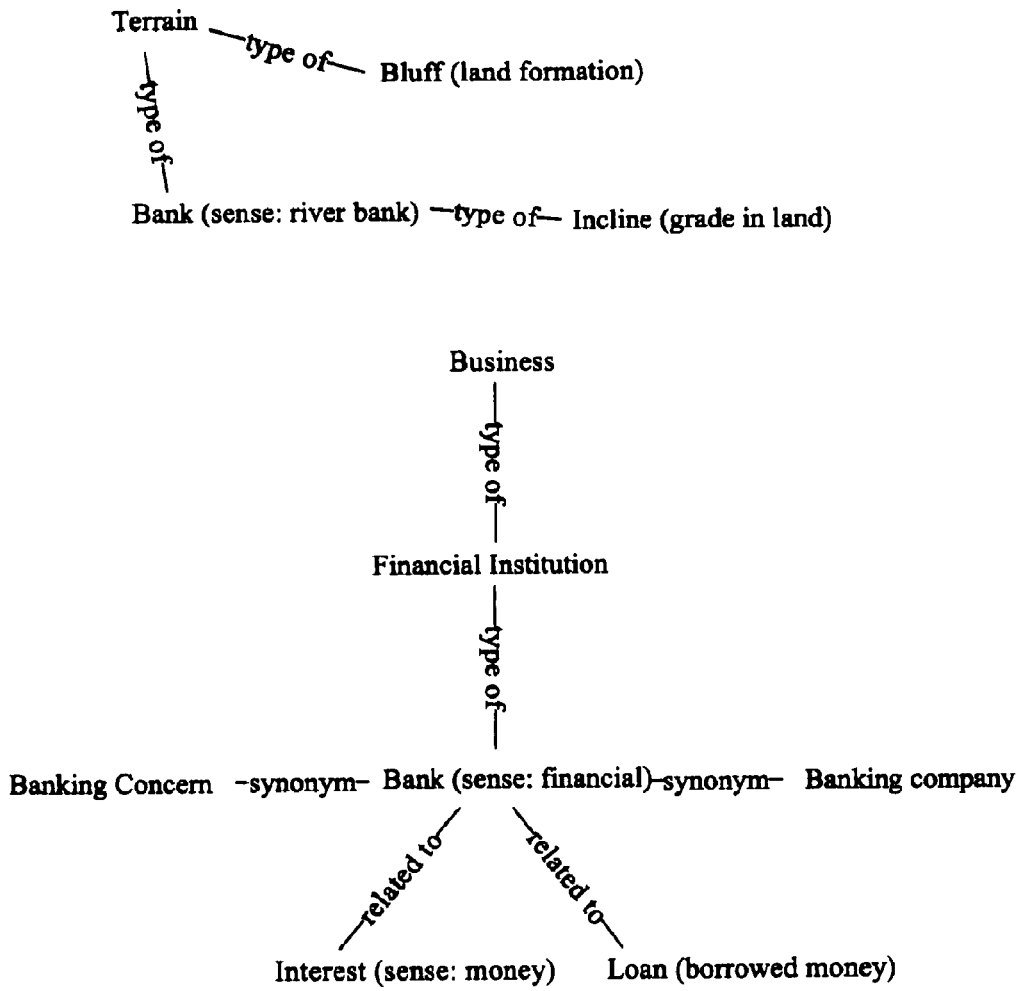
FIG. 3A is a schematic representation of a representative semantic relationship or words for with the system of FIG. 1.

Referring to FIGS. 3A and 3B, example semantic relationships between word senses are shown. These semantic relationships are precisely defined types of associations between two words based on meaning. The relationships are between word senses, that is specific meanings of words.

Specifically in FIG. 3A, for example, a bank (in the sense of a river bank) is a type of terrain and a bluff (in the sense of a noun meaning a land formation) is also a type of terrain. A bank (in the sense of river bank) is a type of incline (in the sense of grade of the land). A bank in the sense of a financial institution is synonymous with a "banking company" or a "banking concern." A bank is also a type of financial institution, which is in turn a type of business. A bank (in the sense of financial institution) is related to interest (in the sense of money paid on investments) and is also related to a loan (in the sense of borrowed money) by the generally understood fact that banks pay interest on deposits and charge interest on loans.

It will be understood that there are many other types of semantic relationships that may be used. Although known in the art, following are some examples of semantic relationships between words: Words which are in synonymy are words which are synonyms to each other. A hypernym is a relationship where one word represents a whole class of specific instances. For example "transportation" is a hypernym for a class of words including "train", "chariot", "dogsled" and "car", as these words provide specific instances of the class. Meanwhile, a hyponym is a relationship where one word is a member of a class of instances. From the previous list, "train" is a hyponym of the class "transportation". A meronym is a relationship where one word is a constituent part of, the substance of, or a member of something. For example, for the relationship between "leg" and "knee", "knee" is a meronym to "leg", as a knee is a constituent part of a leg. Meanwhile, a holonym a relationship where one word is the whole of which a meronym names a part. From the previous example, "leg" is a holonym to "knee". Any semantic relationships that fall into these categories may be used. In addition, any known semantic relationships that indicate specific semantic and syntactic relationships between word senses may be used.

It is known that there are ambiguities in interpretation when strings of keywords are provided as queries and that having an expanded list of keywords in a query increases the number of results found in the search. The embodiment provides a system and method to identify relevant, disambiguated lists of keywords for a query. Providing such a list delineated on the sense of words reduces the amount of extraneous information that is retrieved. The embodiment expands the query language without obtaining unrelated results due to extra senses of a word. For example, expanding the "financial institution" sense of bank will not also expand the other senses such as "river-bank" or "to save". This allows information management software to identify more precisely the information for which a client is looking.

Expanding a query involves using one or both of the following steps:

1. Adding to a disambiguated query keyword sense, any other word and its associated senses that are semantically related to the disambiguated keyword sense.

2. Paraphrasing the query by parsing its syntactic structure and transforming it into other semantically equivalent queries. Paraphrasing the query by parsing its syntactic structure and transforming it into other semantically equivalent queries. The index contains has fields that identify syntactic structures and semantic equivalents for words. Paraphrasing is a term and concept known in the art. Paraphrasing may be applied to words in any document, including web sites.

It will be recognized that the use of word sense disambiguation in a search addresses the problem of retrieval relevance. Furthermore, users often express queries as they would express language. However, since the same meaning can be described in many different ways, users encounter difficulties when they do not express a query in the same specific manner in which the relevant information was initially classified.

For example if the user is seeking information about "Java" the island, and is interested in "holidays" on Java (island), the user would not retrieve useful documents that had been categorized using the keywords "Java" and "vacation". It will be recognized that the semantic expansion feature, according to an embodiment, addresses this issue. It has been recognized that deriving precise synonyms and sub-concepts for each key term in a naturally expressed query increases the volume of relevant retrievals. If this were performed using a thesaurus without word sense disambiguation, the result could be worsened. For example, semantically expanding the word "Java" without first establishing its precise meaning would yield a massive and unwieldy result set with results potentially selected based on word senses as diverse as "Indonesia" and "computer programming". It will be recognized that the described methods of interpreting the meaning of each word and then semantically expanding that meaning returns a more comprehensive and simultaneously more target result set.

Referring to FIG. 3B, to assist in disambiguating such word senses, the embodiment utilizes knowledge base 400 of word senses capturing relationships of words as described above for FIG. 3A. Knowledge base 400 is associated with database 30 and is accessed to assist WSD module 32 in performing word sense disambiguation. Knowledge base 400 contains definitions of words for each of their word senses and also contains information on relations between pairs of word senses. These relations includes the definition of the sense and the associated part of speech (noun, verb, etc.), fine sense synonyms, antonyms, hyponyms, meronyms, pertainyms, similar adjectives relations and other relationships known in the art. While prior art electronic dictionaries and lexical databases, such as WordNet (trademark), have been used in systems, knowledge base 400 provides an enhanced inventory of words and relations. Knowledge base 400 contains: (i) additional relations between word senses, such as the grouping of fine senses into coarse senses, new types of inflectional and derivational morphological relations, and other special purpose semantic relations; (ii) large-scale corrections of errors in data obtained from published sources; and (iii) additional words, word senses, and associated relations that are not present in other prior art knowledge bases.

In the embodiment, knowledge base 400 is a generalized graph data structure and is implemented as a table of nodes 402 and a table of edge relations 404 associating connecting two nodes. Each is described in turn. In other embodiments, other data structures, such as linked lists, may be used to implement knowledge base 400.

In table 402, each node is an element in a row of table 402. A record for each node may have as many as the following fields: an ID field 406, a type field 408 and an annotation field 410. There are two types of entries in table 402: a word and a word sense definition. For example, the word "bank" in ID field 406A is identified as a word by the "word" entry in type field 408A. Also, exemplary table 402 provides several definitions of words. To catalog the definitions and to distinguish definition entries in table 402 from word entries, labels are used to identify definition entries. For example, entry in ID field 406B is labeled "LABEL001". A corresponding definition in type field 408B identifies the label as a "fine sense" word relationship. A corresponding entry in annotation filed 410B identifies the label as "Noun. A financial institution". As such, a "bank" can now be linked to this word sense definition. Furthermore an entry for the word "brokerage" may also be linked to this word sense definition. Alternate embodiments may use a common word with a suffix attached to it, in order to facilitate recognition of the word sense definition. For example, an alternative label could be "bank/n1", where the "/n1" suffix identifies the label as a noun (n) and the first meaning for that noun. It will be appreciated that other label variations may be used. Other identifiers to identify adjectives, adverbs and others may be used. The entry in type field 408 identifies the type associated with the word. There are several types available for a word, including: word, fine sense and coarse sense. Other types may also be provided.

In the embodiment, when an instance of a word has a fine sense, that instance also has an entry in annotation field 410 to provide further particulars on that instance of the word.

Edge/Relations table 404 contains records indicating relationships between two entries in nodes table 402. Table 404 has the following entries: From node ID column 412, to node ID column 414, type column 416 and annotation column 418. Columns 412 and 414 are used to link to entries in table 402 together. Column 416 identifies the type of relation that links the two entries. Each record has the ID of the origin and the destination node, the type of the relation, and may have annotations based on the type. Type of relations include "root word to word", "word to fine sense", "word to coarse sense", "coarse to fine sense", "derivation", "hyponym", "category", "pertainym", "similar", "has part". Other relations may also be tracked therein. Entries in annotation column 418 provide a (numeric) key to uniquely identify an edge type going from a word node to either a coarse node or fine node for a given part-of-speech.

Figure 4:
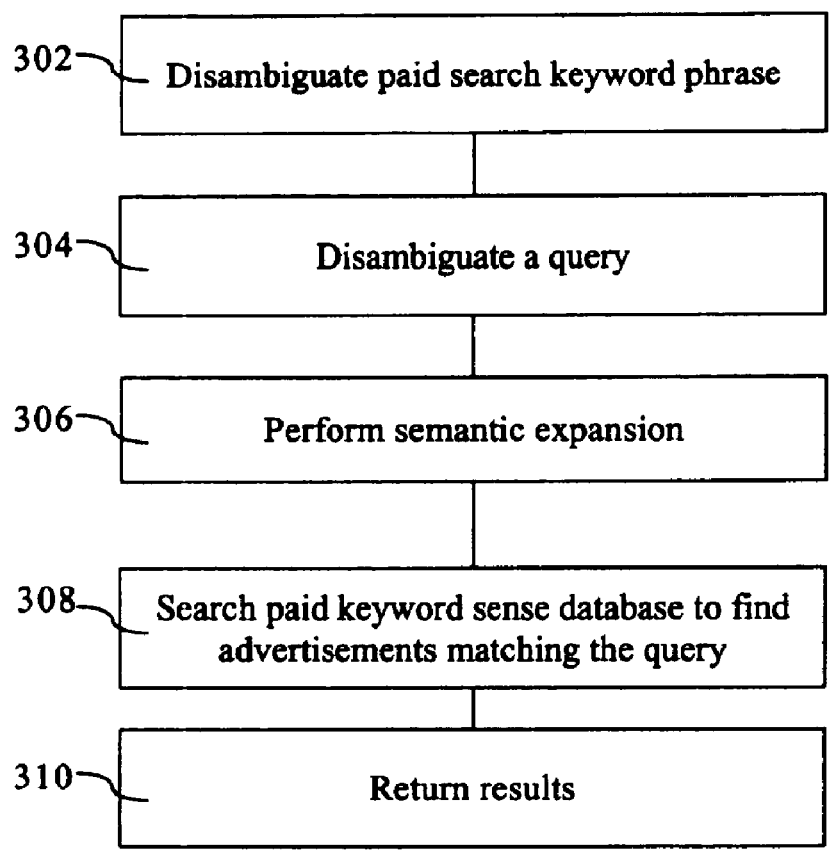
FIG. 4 is a schematic representation of a method performed by the sponsored search engine of FIG. 1 using the word senses of FIG. 2 and the semantic relationships of FIG. 3A.

Referring to FIG. 4, a process performed by the sponsored search engine 20 is shown generally by reference 300. The word sense disambiguation module first identifies which specific meaning of a paid search keyword phrase is the intended meaning at step 302, as previously described. This step may be performed directly by the advertiser, for example by choosing a word sense itself. Alternatively, the paid search keyword phrase may be disambiguated automatically by the sponsored search engine using additional contextual information, such as the text of the advertisement, information from a web site of the advertiser or other information related to the advertiser and/or advertisement.

The sponsored search engine then receives a query from a user and disambiguates the query at step 304. For each word in the query, the word sense disambiguation module identifies which specific meaning of the word is the intended meaning and assigns a probability that the sense is the correct sense to each possible sense.

The sponsored search engine performs semantic expansion at step 306. In this step, the sponsored search engine "expands" the relevant terms to include senses that are semantically related to the subject terms. The expansion is performed on the basis of word sense and accordingly produces a list of related word senses. The semantic relationships may be those described above with reference to FIG. 3. In one embodiment, the search engine semantically expands the disambiguated query and matches the expanded list to the paid search keyword phrase. In another embodiment, the search engine semantically expands the paid search keyword phrase and matches the keyword senses found in the disambiguated query.

The search engine can also paraphrase the relevant terms to find syntactic equivalent terms. Techniques of paraphrasing words are generally known in the art.

The sponsored search engine searches the paid keyword sense database to find advertisements matching the query at step 308. The information displayed includes advertisements for which the paid search keyword matches the query keyword senses and other word senses which are semantically related to the query keyword senses.

It will be recognized that expanding the query using semantic relationships between keyword senses allows advertisements to be displayed even when the exact language of the query does not match the paid search keyword. This would be the case when the query uses senses closely related to paid search keywords.

Finally, the sponsored search engine returns results at step 310. The results include any relevant advertisements found as well as standard search results. The search results may be found by any means, such as a keyword search or a disambiguated keyword search.

It will be recognized that by using word senses to create paid search listings, the same spelling of a keyword may be sold to different advertisers. They would each buy a different sense of the same keyword.

It will be recognized that expanding the list of keywords in the query increases the number of results found in the search. Moreover, it will be recognized that use of an index delineated on the sense of words reduces the amount of extraneous information that is retrieved. The query language may be expanded without obtaining unrelated results due to extra senses of a word. For example, expanding the "financial institution" sense of bank will not also expand the other senses such as "river-bank" or "to save".

Establishing the correct meaning of a word allows information management software to identify more precisely the information a user is looking for and provide more appropriate advertising. For example, queries about "Java" the island also match documents about "Java" the object-oriented programming language. By determining the correct meaning of the word "Java" the system can provide advertisements appropriate to the meaning intended by the user.

Use of word sense disambiguation to display paid search listings addresses the problem of retrieval relevance. Users often express queries as they would express language. However, since the same meaning can be described in many different ways, an advertisement may not be located when users do not express a query in the same specific manner in which the advertisement was initially classified.

For example if the user is seeking information about "Java" the island and is interested in "holidays" on Java, the user would not be shown an advertisement that had been categorized using the keywords "Java" and "vacation". It will be recognized that the semantic expansion feature addresses this issue. It has been recognized that deriving precise synonyms and sub-concepts for each key term in a naturally expressed query increases the volume of relevant advertisements that may be displayed. If this were performed using a thesaurus without word sense disambiguation, the result could be worsened. For example, semantically expanding the word "Java" without first establishing its precise meaning would yield advertisements unrelated to the user's query. It will be recognized that the described methods of interpreting the meaning of each word and then semantically expanding that meaning returns a more comprehensive and simultaneously more targeted set of advertisements.

Another aspect of the embodiment provides a means of influencing the order of the search results. For example, semantic relationships between the word senses in the paid search keyword phrase and that of the query can be used to refine the order in which the advertisements are displayed. In one example, an exact match between terms can be ranked higher than a semantic match. The probabilities of the keyword senses in the query may be used to refine the order in which the results are displayed. For example, the higher the probability, the more prominent the order of the display for the senses.

The embodiment provides a method of associating a web site with the second form of contextual advertisement described earlier. As noted earlier, the second form of contextual advertisement involves sending advertisements to users while they are interacting with content, based on the contextual relevance of the content with which they are currently interacting. Contrary to Paid Search Listings, the second form of advertisement provides an advertisement to a user when no query has been entered by that user.

In the second form of advertising, a web site or web page is registered with a company offering contextual advertising services. Registration includes creation of an account on a centralized server of the company and includes the assignment of an identifier for the web site and/or individual web pages. The identifier is a plurality of characters. Using the knowledge base 400, each web page can be associated with a list of keyword senses that describe the content of the web page or the topic of the page or web site. Keyword senses provide more precise information for the word instead of the word itself. As noted earlier, keyword senses may be fine or coarse. Identification of a particular set of keyword senses may be done manually or through word sense disambiguation of text associated in the web site using techniques described above.

As a further development, the set of keyword senses may be expanded and paraphrased to include additional related search terms using techniques described above. In one form, a word sense can be expanded by searching for hypernyms associated with the sense. In advertising constructs, hypernyms provide useful additional words having senses which would likely be compatible with the original word sense for the purpose of advertising. Other relations, as defined above, may also be used to identify additional word senses.

The accounts are stored in a database on the centralized server and each registered web site or web page, the assigned identifier, the associated account number, and the descriptive keyword senses are stored in a separate table in the database. Furthermore, the content of the web page can be processed by the server. Processing includes fetching the web page, disambiguating the information on the web page and indexing the keyword senses of the disambiguated information by storing the word, keyword senses, probabilities and the associated web page identifier in a table of a database.

When an end-user requests to view a page on the web site, the web site returns as part of the HTML code for the web page the URL address of the centralize advertising server and the identifier of the web page. The end-user's web browser will contact the advertising server using HTTP and transmit the web page's identifier to the server.

The server analyzes the information in the end-user's request as described below and selects an advertisement to display that is both relevant and that offers the highest revenue for both the advertising company and the operator of the web site. The advertisement response is composed of HTML code to display the advertisement and a URL link to be invoked if the user clicks on the advertisement. The URL link to be invoked includes HTTP encoded parameters containing the web page identifier and an identifier of the advertisement displayed and the URL address of the centralized server.

As part of the response to the end-user's request, a unique identifier is assigned to the end-user which is stored as a cookie on the end-user's web-browser. If such an end-user identifier was already present as a cookie in the end-user's web-browser, then this identifier is transmitted with the HTTP request (note that setting a cookie on an end-user's web-browser and retrieving later is a standard feature of HTTP and is well known in the art of web site design and programming).

If the end-user clicks on the advertisement to view its details, a second HTTP request is sent to the advertising server with the encoded information described above. The advertising server records the transaction which will cause a fee to be billed to the company being advertised. The centralized server may record the fact that the end-user was interested in this advertisement and may collect other demographic information about the end-user useful in selecting advertisements likely to interest the end-user. This includes but is not limited to factors such as: age, gender, income, address, including zip code, profession, hobbies, electronic equipment owned, purchase habits and others.

The end-user identifier, when present, is transmitted as part of requests sent to the centralized advertising server and allows the advertising server to also track advertisements that have already been displayed to a user as well as the advertisement viewing or purchasing habits of the end-user. This information may be used as characteristics when selecting an advertisement to display to an end-user.

Companies wishing to advertise also register and create an account with the company operating the centralized advertising server. A plurality of advertisements can be registered and each includes the end-user and web site characteristics that should be present for the advertisement to be displayed. Each advertisement also has parameters describing the amount the company is will to pay or bid to either have its advertisement displayed or is willing to pay or bid if the end-user clicks on the advertisement. The company may also set a maximum limit it is will to pay in advertising fees per time-period. The web site characteristic includes a list of keyword senses associated with each advertisement. The end-user characteristics include demographic attributes of the end-user that are of interests to the company advertising.

When the advertising server receives a request from an end-user's web-browser for advertisement in response to having displayed a web site, the server can use any combination of two methods to select advertisement to include in a response to the end-user.

The first method consists of comparing the characteristics of the end-user and those of the web site with the characteristics of advertisements in the database of advertisements. An advertisement is a candidate when the characteristics match. In the case of the characteristics that include keyword senses, an advertisement is considered a match when the keywords senses of the advertisement match the keyword senses describing the web site. These keywords senses are either the descriptive keyword senses entered in the database for that web site when the web site was registered with the advertising service or are the keyword sense that were obtained when the web page's content was disambiguated and indexed.

In addition to having an exact match of keyword senses for both the advertisement and the web page, the keyword senses can be semantically expanded using the embodiment by adding to the list of acceptable senses other senses that have semantic relations to the original senses. The embodiment also selectively uses paraphrasing techniques to expand the keyword senses utilizing semantically dependent terms derived from syntactic structures of selected words in the web site. The selected words may be manually selected or may be identified using an algorithm to identify notable words in the web site.

The second method to identify advertisement that matches the characteristics of the end-user and the web site is to use a machine learning classifier to identify if the characteristics of the advertisement, including the advertisement, including the keyword senses, match those of the end-user or the web page. A machine learning classification algorithm offers the benefit that it does not require an exact match. An example machine learning algorithm that is appropriate for this task of classification of end-user and web page characteristics to advertisement is Naive Bays and is well known in the art.

Whether the first or the second method is used, both produce a list of candidate advertisements, where the characteristics of the advertisements match those of the request. The advertisement server can select the advertisement to return in the response by selecting the advertisement with the highest bid.

It will be appreciated that the keyword senses of the advertisement may also be manually selected from knowledge base 400 or selected using word sense disambiguation techniques described above.

It will also be appreciated that using keyword senses as a matching criteria for web sites to advertisements allows fewer keywords to be associated with a web site, because a keyword sense for a given word contains more information about its meaning and therefore, fewer keyword senses would need to be associated with the web site, compared with utilizing equivalent word phrases.

Another feature of the embodiment provides dynamic interaction with a disambiguated document. In particular, when a disambiguated document is displayed and when the user points to a word in the document, the key information for that word is used to identify the appropriate advertisement for display.

The embodiment also provides using its word sense disambiguation techniques and modules as a keyword suggestion tool. When an advertiser wishes to place a bid on a system, it must to provide a list of keywords that it wishes to bid on. The embodiment is be used in a document analyzer to assist in this process by providing the advertiser with a list of candidate keywords that closely matches the topic of documents on his web site. The embodiment also allows the above noted document analyzer to an advertiser with a list of candidate keys.

Yet another embodiment allows a content provider to use the system to sell a "superordinate concept" or a hypernym (that is, a word having a generic meaning). Such terms, which are more generic in nature, can be associated with any number of related terms without having to specifically recite each such related term. Thus, the provider can sell such generic terms at a premium price since one word would be linked to any number of others. In one example, the term "computer equipment" can be considered as a hypernym that is related to other more specific terms for such equipment such as "terminals", "mouse", "keyboard" etc.

Although the invention has been described with reference to certain specific embodiments, various modifications thereof will be apparent to those skilled in the art without departing from the scope of the invention. A person skilled in the art would have sufficient knowledge of at least one or more of the following disciplines: computer programming, machine learning and computational linguistics.

We claim:

1. A computer implemented method of associating advertisements with a displayed web page, said method comprising the steps of:
    a) (i) obtaining advertisement keyword meanings associated with said advertisements, each of the advertisement keyword meanings comprising a specific intended meaning of a word contained in the respective advertisement;
    (ii) indexing the advertisements according to the associated keyword meanings;
    (iii) storing said indexed advertisements in a database; and
    b) (i) disambiguating content of said displayed page to identify keyword meanings of words contained in said displayed page, each of said page keyword meanings comprising a specific deduced intended meaning of a respective word on the web page, in view of the context of its usage on the web page;
    (ii) expanding said page keyword meanings using their relevant semantic relations to other word meanings to create a list of expanded page keyword meanings; and,
    (iii) searching said database of indexed advertisements to identify matches between the expanded page keyword meanings and the advertisement keyword meanings;
    (iv) extracting advertisements indexed to the advertisement keyword meanings matched to the page keyword meanings, said extracted advertisements comprising advertisements relevant to said displayed page;
    (v) displaying said relevant advertisements in association with the displayed page.

2. The method of claim 1, wherein steps (a) and (b) are conducted independently of each other.

3. The method of claim 2, wherein disambiguating said page to identify page keyword meanings comprises attaching probabilities to said page keyword meanings.

4. The method of claim 2, wherein the advertisement keyword meanings are supplied by an advertiser or identified by disambiguating words in said advertisements.

5. The method of claim 4, wherein said advertisement keyword meanings are expanded using their relevant semantic relations to other word meanings to create a list of expanded advertisement keyword meanings.

6. A computer implemented method of associating advertisements with one or more web pages, the method comprising the steps of:
    a) obtaining advertisement keyword meanings associated with said advertisements, said advertisement keyword meanings being supplied by advertisers or identified by disambiguating words in said advertisements, wherein each of the advertisement keyword meanings comprise a specific intended meaning of a word contained in the respective advertisement; and,
    b) (i) disambiguating content of said web pages to identify keyword meanings of words contained in said web pages, each of said page keyword meanings comprising a specific deduced intended meaning of a respective word on the web page, in view of the context of its usage on the web page;
    (ii) indexing at least one of the advertisements or the web pages, wherein said indexing is based on the associated keyword meanings of said advertisement or said web pages, respectively;
    (iii) searching said advertisement keyword meanings to identify matches between the web page keyword meanings and the advertisement keyword meanings, said matches comprising advertisements relevant to said web pages; and
    (iv) displaying said relevant advertisements in association with the web pages.

7. A system for associating advertisements with a web page, said system comprising one or more tangible computer readable storage media having stored thereon:
    a database containing advertisements and associated advertisement keyword meanings;
    an indexing module for creating an advertisement reference index for said advertisements contained in said database, wherein said advertisements are indexed based on the associated advertisement keyword meanings;
    a disambiguation module for disambiguating words contained on the web page into page keyword meanings, each of said page keyword meanings comprising a specific deduced intended meaning of a respective word on the web page, in view of the context of its usage on the web page;
    a keyword expanding module for expanding said page keyword meanings using their relevant semantic relations to other word meanings to create an expanded list of page keyword meanings; and,
    a text processing module for:
        searching the advertisement reference index to find relevant advertisements for said web page by matching the page keyword meanings to the advertisement keyword meanings indexed in said database; and
        providing search results comprising said relevant advertisements.

8. The system of claim 7 wherein, after expanding the page keyword meanings, said keyword expanding module further paraphrases text contained on said web page by parsing the syntactic structure of said text and transforming it into additional semantically equivalent text using the original page keyword meanings or the expanded page keyword meanings.

9. The system of claim of claim 7 wherein said disambiguation module disambiguates words contained in the advertisements to identify said advertisement keyword meanings.

10. The system of claim 7 wherein:
    said database further contains said web pages and associated page keyword meanings;
    said indexing module further creates a web page reference index for said web pages contained in said database, wherein said web pages are indexed based on the associated page keyword meanings; and,
    said text processing module searches the advertisement reference index and the web page reference index to find matches between the indexed advertisement keyword meanings and the indexed page keyword meanings.

* * * * *